(12) United States Patent
Perfetto et al.

(10) Patent No.: US 8,767,931 B2
(45) Date of Patent: Jul. 1, 2014

(54) PROVISIONING IN COMMUNICATIONS SYSTEMS

(75) Inventors: Josh Perfetto, San Jose, CA (US);
Saurav Chatterjee, San Jose, CA (US);
Paul Fullarton, San Jose, CA (US);
Lorraine Ling, San Jose, CA (US);
Hemendra Rana, San Jose, CA (US);
Mike White, San Jose, CA (US)

(73) Assignee: Orative Corporation, San Jose, CA (US)

( * ) Notice: Subject to any disclaimer, the term of this patent is extended or adjusted under 35 U.S.C. 154(b) by 1650 days.

(21) Appl. No.: 11/509,474

(22) Filed: Aug. 23, 2006

(65) Prior Publication Data

US 2007/0042756 A1 Feb. 22, 2007

Related U.S. Application Data

(63) Continuation-in-part of application No. 10/890,922, filed on Jul. 14, 2004, now Pat. No. 8,041,020.

(60) Provisional application No. 60/487,143, filed on Jul. 14, 2003, provisional application No. 60/710,998, filed on Aug. 23, 2005, provisional application No. 60/711,051, filed on Aug. 23, 2005, provisional application No. 60/711,053, filed on Aug. 23, 2005.

(51) Int. Cl.
*H04M 3/42* (2006.01)
*H04M 1/64* (2006.01)
*H04M 11/00* (2006.01)
*H04L 12/58* (2006.01)
*H04M 1/725* (2006.01)
*H04M 1/663* (2006.01)
*G06F 3/00* (2006.01)

(52) U.S. Cl.
USPC ............ 379/201.01; 379/88.12; 379/100.08; 379/201.05; 455/412.1; 455/412.2; 455/418; 455/419; 715/749

(58) Field of Classification Search
USPC ......... 379/88.12, 93.17, 114, 211.01, 221.01, 379/230, 260, 433.02, 433.11, 100.08, 379/201.05, 201.01; 455/406, 569.1, 412.1, 455/412.2, 481, 419, 418; 709/206, 217; 715/749
See application file for complete search history.

(56) References Cited

U.S. PATENT DOCUMENTS

| | | | |
|---|---|---|---|
| 5,732,348 A | 3/1998 | Norimatsu |
| 5,903,629 A | 5/1999 | Campbell |
| 6,092,097 A | 7/2000 | Suzuoka |
| 6,147,977 A | 11/2000 | Thro |

(Continued)

OTHER PUBLICATIONS

PCT International Search Report, International Application No. PCT/US2006/033181, Apr. 25, 2007.

(Continued)

*Primary Examiner* — Khai N Nguyen
(74) *Attorney, Agent, or Firm* — Tucker Ellis LLP

(57) ABSTRACT

Provisioning is described for use in communications systems. The provisioning includes receiving a message at an inbox of a device. The message includes information of an electronic location of a source device from which to download the appropriate application and device and user-specific information used for configuration of the application. An application is automatically transferred to the device in response to selection of the received message by a user of the device. The application is automatically installed on the device. The application is auto-started, at which time it self-configures using the original message.

37 Claims, 11 Drawing Sheets

(56) References Cited

U.S. PATENT DOCUMENTS

| | | | |
|---|---|---|---|
| 6,272,214 B1 | 8/2001 | Jonsson | |
| 6,345,288 B1 | 2/2002 | Reed | |
| 6,351,656 B1 | 2/2002 | Burgan | |
| 6,373,817 B1 | 4/2002 | Kung | |
| 6,424,711 B1 | 7/2002 | Bayless | |
| 6,732,111 B2* | 5/2004 | Brodersen et al. | 1/1 |
| 6,751,297 B2 | 6/2004 | Nelkenbaum | |
| 6,754,181 B1 | 6/2004 | Elliott | |
| 6,920,486 B2 | 7/2005 | Kiiskinen | |
| 2002/0090932 A1* | 7/2002 | Bhatia et al. | 455/412 |
| 2002/0144151 A1* | 10/2002 | Shell et al. | 713/201 |
| 2002/0183080 A1* | 12/2002 | Poor et al. | 455/466 |
| 2003/0054810 A1* | 3/2003 | Chen et al. | 455/422 |
| 2003/0065738 A1* | 4/2003 | Yang et al. | 709/215 |
| 2003/0103484 A1* | 6/2003 | Oommen et al. | 370/338 |
| 2003/0108039 A1* | 6/2003 | Shell et al. | 370/389 |
| 2003/0120593 A1 | 6/2003 | Bansal | |
| 2003/0157946 A1* | 8/2003 | Chong | 455/466 |
| 2003/0224810 A1* | 12/2003 | Enzmann et al. | 455/466 |
| 2004/0082346 A1* | 4/2004 | Skytt et al. | 455/456.3 |
| 2004/0203949 A1* | 10/2004 | Nielsen et al. | 455/466 |
| 2004/0248600 A1 | 12/2004 | Kim | |
| 2004/0267971 A1* | 12/2004 | Seshadri | 710/8 |
| 2005/0041647 A1 | 2/2005 | Stinnie | |
| 2005/0068980 A1 | 3/2005 | Mathew | |
| 2005/0262202 A1* | 11/2005 | Motoyama et al. | 709/206 |
| 2005/0272413 A1 | 12/2005 | Bourne | |
| 2006/0141982 A1 | 6/2006 | Timmins | |
| 2007/0022058 A1 | 1/2007 | Labrou | |

OTHER PUBLICATIONS

Written opinion of the International Searching Authority for Application No. PCT/US2006/033181.

PCT International Search Report, International Application No. PCT/US2006/033071, Apr. 20, 2007.

PCT International Search Report, International Application No. PCT/US2007/000487, Oct. 18, 2007.

PCT International Search Report, International Application No. PCT/US2007/007064, Jun. 30, 2008.

* cited by examiner

PROVISIONING IN COMMUNICATIONS SYSTEMS

RELATED APPLICATIONS

This application is a continuation-in-part (CIP) application of U.S. patent application Ser. No. 10/890,922, filed Jul. 14, 2004 now U.S. Pat. No. 8,041,020, which claims the benefit of U.S. Patent Application No. 60/487,143, filed Jul. 14, 2003.

This application claims the benefit of U.S. Patent Application No. 60/710,998, filed Aug. 23, 2005.

This application claims the benefit of U.S. Patent Application No. 60/711,051, filed Aug. 23, 2005.

This application claims the benefit of U.S. Patent Application No. 60/711,053, filed Aug. 23, 2005.

TECHNICAL FIELD

The disclosure herein relates generally to communication systems and, in particular, to wireless communication systems.

BACKGROUND

Mobile communications in today's real-time enterprise can be challenging. The problem is further complicated by changes in the workplace which have led to a more geographically dispersed and highly mobile workforce. In spite of the popularity of electronic mail (email), large numbers of people and employees still depend upon numerous other types of communications to collaborate with colleagues and drive business success. This is especially true for those in sales, service, operations and management roles who rely upon timely access to and coordination with colleagues as well as other employees, customers, partners and suppliers. Thus, communications remain an essential means of conducting business and staying in contact.

As a result of communications being so critical to business today, many professionals and enterprise employees now handle very large numbers of communications each business day. These communications can include disparate types of communications like emails, voicemails, instant messaging to name a few. Managing these large numbers and disparate types of communications consumes large amounts of time during the typical business day. For the growing number of people who spend a significant part of their day away from their offices or in meetings or other events, managing this large number of communications is highly time-consuming, frustrating and inefficient. Consequently, there is a need for communication systems that provide efficient, timely, and proactive real-time management of multiple types of communications.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

Provisioning is described herein for use in communications systems. The provisioning includes receiving a message at an inbox of a device. The message includes information of an electronic location of a source device from which to download the appropriate application and device and user-specific information used for configuration of the application. An application is automatically transferred to the device in response to selection of the received message by a user of the device. The application is automatically installed on the device. The application is auto-started, at which time it self-configures using the original message.

In the following description, numerous specific details are introduced to provide a thorough understanding of, and enabling description for, embodiments of the communications systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

A communication system is provided herein that uses client-server architectures to improve the efficiency of multiple types of communications. The communication system, referred to herein as the active mobile collaboration (AMC) system, includes a facilitator. The facilitator of an embodiment is an application hosted on one or more servers or other processor-based devices, and communicates a portable or mobile communications device via one or more couplings. The facilitator communicates with the AMC client of a host portable device via a network coupling for example. The facilitator of alternative embodiments can be distributed among one or more portable processor-based devices including the same communication devices as the client application.

The AMC system also includes a client. The client, also referred to as the AMC client, is a component application of a variety of processor-based mobile communication devices and telephones. The components of the AMC system function to improve efficiency of communications by allowing communication device users to increase accessibility of enterprise and personal contact information from mobile phones and other personal digital assistants (PDAs), dynamically manage how and when mobile communications take place, intelligently screen messages, regardless of message type, based on identity of a messaging party, urgency, and subject matter, and determine which contacts in a directory are available to talk and which ones choose not to be disturbed, to name a few.

Figure 1:
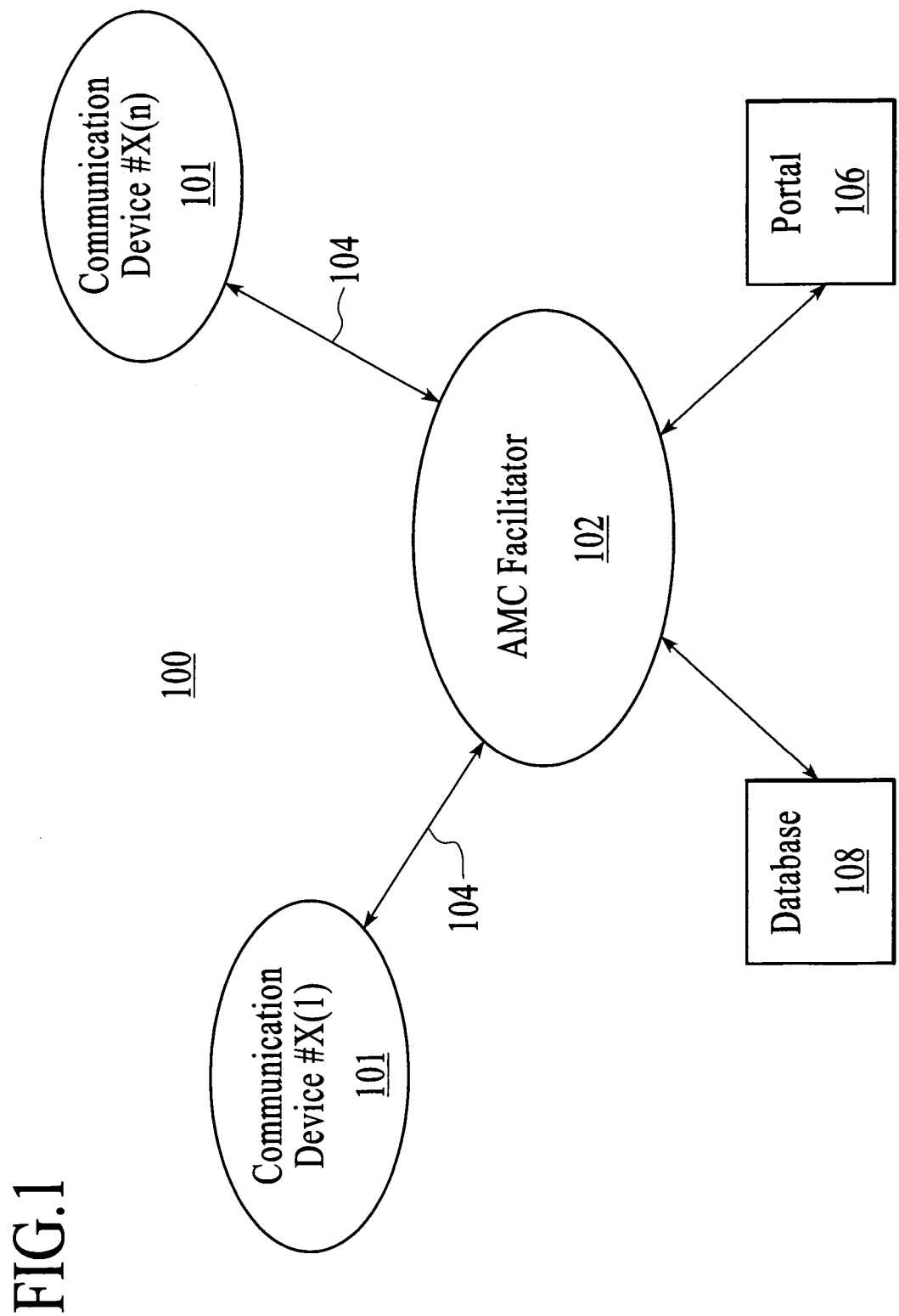
FIG. 1 is a block diagram of an active mobile collaboration (AMC) system, under an embodiment.

FIG. 1 is a block diagram of an active mobile collaboration (AMC) system 100, under an embodiment. The AMC system 100 includes any number X(n) of communication devices 101 coupled for communication via one or more facilitators 102 and one or more couplings 104. One or more of the communication devices 101 include an AMC client application. Likewise, the facilitator 102, also referred to herein as the AMC server 102, includes a facilitator application. The AMC client and facilitator function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones. The AMC system 100 of an embodiment also includes couplings with one or more portals 106 and/or one or more databases 108, but is not so limited.

The communication devices 101 and facilitators 102 described herein are processor-based components running or hosting numerous applications or programs. As such, the communication devices 101 and facilitators 102 can include one or more processors (not shown) coupled among any number/combination of components (not shown) known in the art, for example buses, controllers, memory devices, and data input/output (I/O) devices, in any number of combinations.

The communication devices 101 described herein include processor-based electronic devices, for example, cellular telephones, personal computers, portable computing devices, portable telephones, portable communication devices, subscriber devices or units, PDAs, devices, wireless devices, wireline devices, voice over Internet Protocol (VOIP) devices, private branch exchange (PBX) devices, clients, soft clients, and desktop clients to name a few. The communication devices 101, also referred to as handsets, client devices, devices, mobile communication devices, and portable communication devices, can include all such devices and equivalents, and are not limited to the communication devices described above.

The couplings 104 include wired couplings, wireless couplings, and hybrid wired/wireless couplings, but are not so limited. Furthermore, the couplings 104 can include various networks and/or network components (not shown) of a communication service provider or carrier, but are not so limited. The network and corresponding network components, when present in the couplings 104, can be any of a number of network types known in the art including, but not limited to, local area networks (LANs), metropolitan area networks (MANs), wide area networks (WANs), proprietary networks, backend networks, and the Internet.

Figure 2:
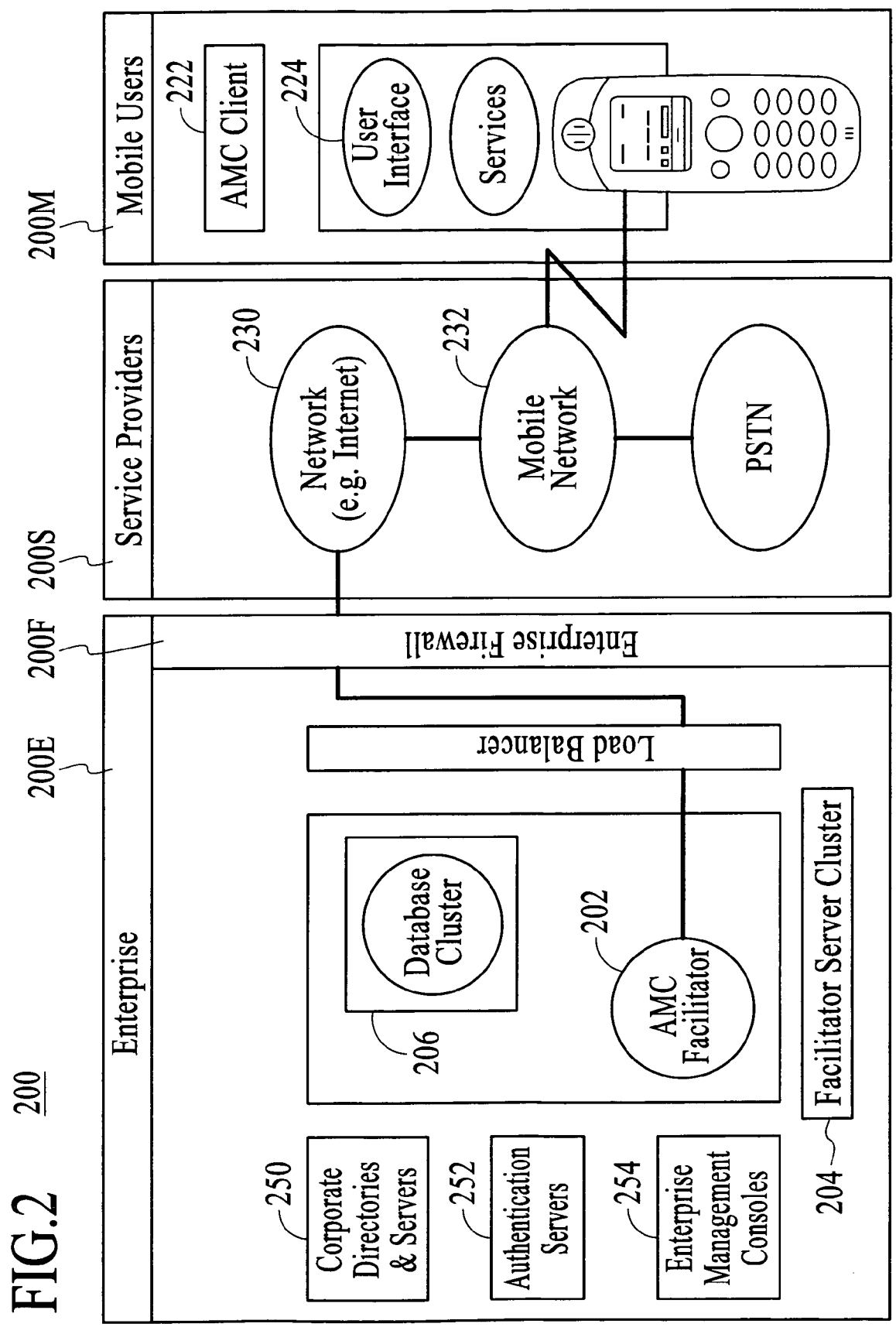
FIG. 2 is a block diagram of a communications system that includes an AMC system, under an alternative embodiment.

FIG. 2 is a block diagram of a communications system 200 that includes an AMC system, under an alternative embodiment. The AMC system includes a facilitator 202 and a client 222 as described elsewhere herein. The facilitator 202 can be one or more facilitators that form a facilitator server cluster 204 and/or database cluster 206 within the enterprise 200E that are resident behind the enterprise firewall 200F, but the AMC system is not so limited. The host enterprise 200E also includes numerous other components, for example, corporate directories and servers 250, authentication servers 252, and enterprise management consoles 254 to name a few. The facilitator 202 is an integrated component of the host enterprise 200E and as such integrates with one or more components of the enterprise 200E. For example, couplings between the facilitator 202 and messaging and collaboration servers (e.g. Microsoft® Exchange) and/or corporate or other directories of the enterprise 200E allow easy, over-the-air download of personal and corporate contact information to devices, as well as searching of personal and corporate contact directories from the device. Other information of the enterprise 200E can also be delivered to the devices using the AMC system, information including but not limited to calendar information, calendar alerts, calendar reminders, etc.

The facilitator 202 couples to a device of one or more users via one or more network couplings. As an example, the facilitator 202 couples to devices using one or more service provider networks 200S. In this example, the facilitator 202 couples to one or more service provider networks or infrastructures 200S via network couplings 230 (e.g. Internet), and then couples to devices 200M via the respective service provider networks 232. The AMC system protects data transfers between the facilitators 202 and the devices 200M using secure couplings, for example, protected with end-to-end security protocols like Secure Sockets Layer (SSL) or Transport Layer Security TLS cryptographic protocols.

The devices 200M of an embodiment include the AMC client 222. The AMC client 222, also referred to as the client 222, includes a graphical user interface 224 that integrates with the device applications and allows users to receive and scan enterprise information of the enterprise 200E. The enterprise information includes contact information, directory information, alerts that can include calendar reminders, conference notifications and call requests from colleagues, as described herein and in the Related Applications. Call requests include relevant details such as name, urgency, and subject matter to help users move business forward while screening out unwanted interruptions. The client 222 further provides a presence-aware phonebook that lets users find a contact and determine if the contact is available to talk, even before placing a call. The client 222 eliminates the need to manually enter contacts into the host device 200M. Instead, users download personal and/or corporate contact information over-the-air to their devices. The facilitator 202 and client 222 of the AMC system therefore provide automated, two-way synchronization to ensure contacts are backed up and up to date at the enterprise 200E.

An example of the AMC system of an embodiment is available as the Orative Enterprise Software from Orative Corporation of San Jose, Calif. The facilitator is available as the Orative Enterprise Server (e.g. runs on a standards-based, Java 2, Enterprise Edition (J2EE) platform that operates securely behind the enterprise firewall). The client is available as the Orative Client Software (e.g. runs on a variety of popular devices, and leverages the latest application development environments including Symbian OS, Java and BREW to name a few).

While dynamically managing how and when mobile calls take place and intelligently screening calls based on numerous factors described above, the components of the AMC system also improve efficiency of voice communications by increasing accessibility of enterprise and personal contact information from mobile phones. Components of the AMC system of an embodiment support aggregation and management of contact information from various sources including, but not limited to, directories resident on desktop computers, corporate/enterprise directories, and contact information of the device native phonebook, and provide data coupling between those sources and devices hosting the AMC client. This contact information is managed by providing the user with access via the device to dynamically integrated contacts of a contact list and a number of phonebooks from multiple sources. The dynamic integration of multiple disparate directories provided by the AMC system of an embodiment allows a user to indicate the contacts he/she desires among all directories of a corresponding enterprise server, and then dynamically synchronizes all enterprise directories so as to place the desired information from the directories together into a common AMC phonebook, as described in detail below.

Figure 3:
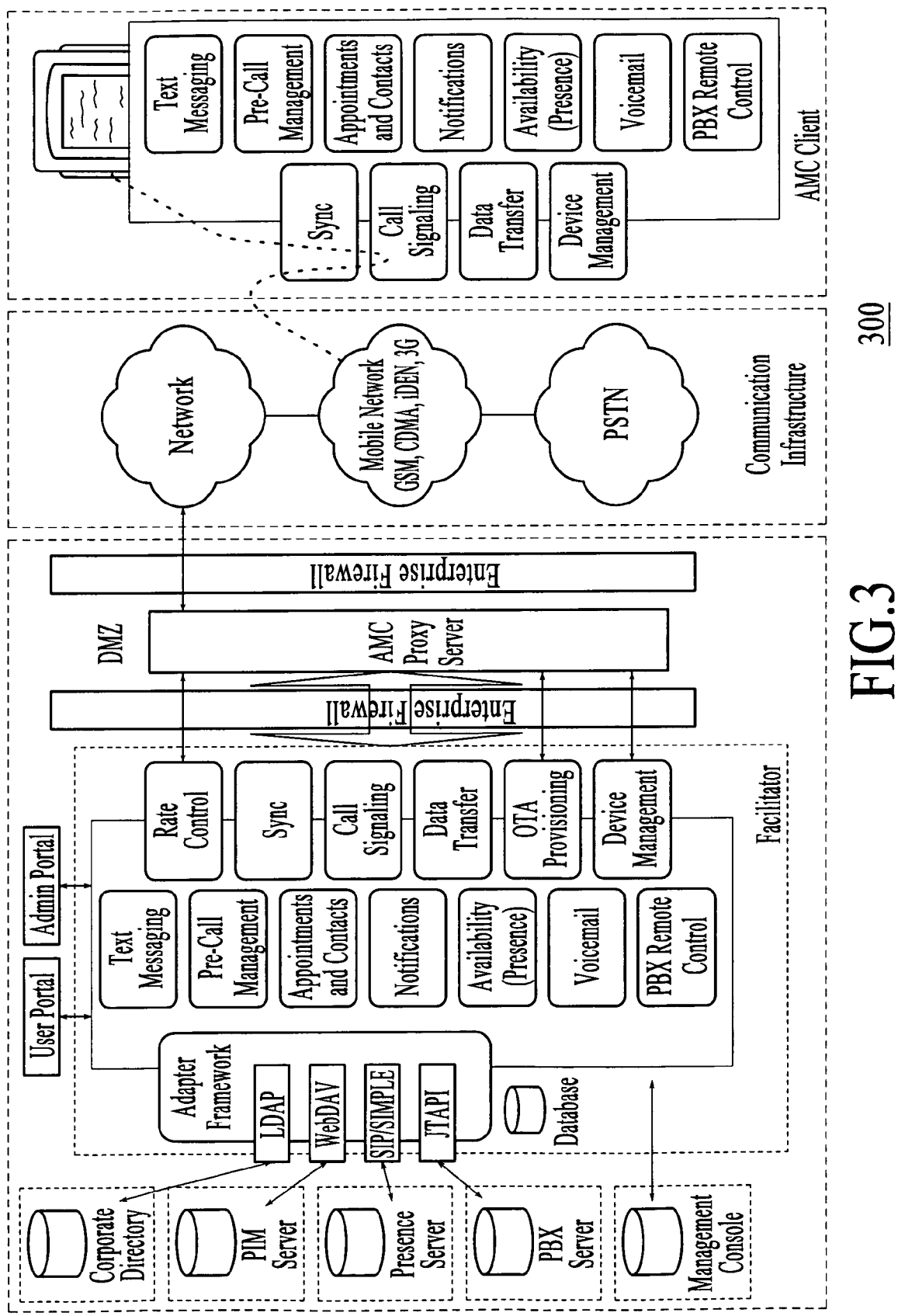
FIG. 3 is a block diagram of a communications system that includes an AMC system, under another alternative embodiment.

FIG. 3 is a block diagram of a communications system 300 that includes an AMC system, under another alternative embodiment. The communications system 300 includes enterprise components, with which the AMC system is integrated, coupled to client devices via a communication or network infrastructure. The enterprise components include, but are not limited to, one or more of a corporate directory, Personal Information Manager (PIM) server, presence server, Private Branch Exchange (PBX) server, and management console.

The AMC system includes a facilitator as described herein. The facilitator includes an adapter or adapter framework by which the facilitator simultaneously integrates with components of the enterprise and enterprise servers. The facilitator uses an adapter for each directory server to which it integrates. The adapter of an embodiment is a protocol-specific adapter for each directory server to which it integrates; alternatively, the adapter includes vendor-specific adapters. The facilitator integrates with multiple directories simultaneously, including Lightweight Directory Access Protocol (LDAP)/Active Directory, Exchange, Domino, and third-party instant message (IM)/presence server buddy-lists. The AMC adapters convert the data from the enterprise directories (e.g. external) into a common data structure. The converted data is coalesced together into a single directory presented to the user on device via the client. The single directory generated from the data of multiple directories is referred to as the AMC phonebook.

The facilitator includes one or more applications that support multiple functions provided by the AMC system. The AMC system functions include, but are not limited to, test messaging, pre-call management, appointments and contacts, notifications, availability (presence), voicemail, and PBX remote control.

The facilitator couples to a device of one or more users via one or more network couplings or infrastructures. As an example, the facilitator couples to a mobile network using a coupling with another communications network (e.g. Internet). The mobile network or mobile infrastructure, which includes one or more service provider networks associated with respective ones of the devices, provides a coupling to individual devices.

Communications between the facilitator and the device are controlled by the facilitator using one or more components and applications. The functions provided by the facilitator in controlling communications include one or more of rate control, synchronization (sync), call signaling, data transfer, OTA provisioning, and device management to name a few. Optionally, the communications path between the facilitator and the communications network includes an AMC proxy server.

The AMC system of an embodiment includes a provisioning server or component for use in providing services of the AMC system to users of devices. The provisioning server, which can be a component of the facilitator, provides over the air (OTA) provisioning of a device. Provisioning includes transferring to and installing on the device a third-party application and configuring this application. Provisioning of the AMC system uses a single provisioning message in a one-step process; this one-step provisioning is in contrast to the multi-step provisioning of typical systems. The provisioning system, using only end user-supplied information of a type of a target device, the device phone number or unique name or address, and service provider, automatically performs device configuration. Thus, the provisioning of an embodiment involves minimal end-user inputs or actions, and does not require any non pre-installed software to be hosted on the device to support the provisioning.

Figure 4:
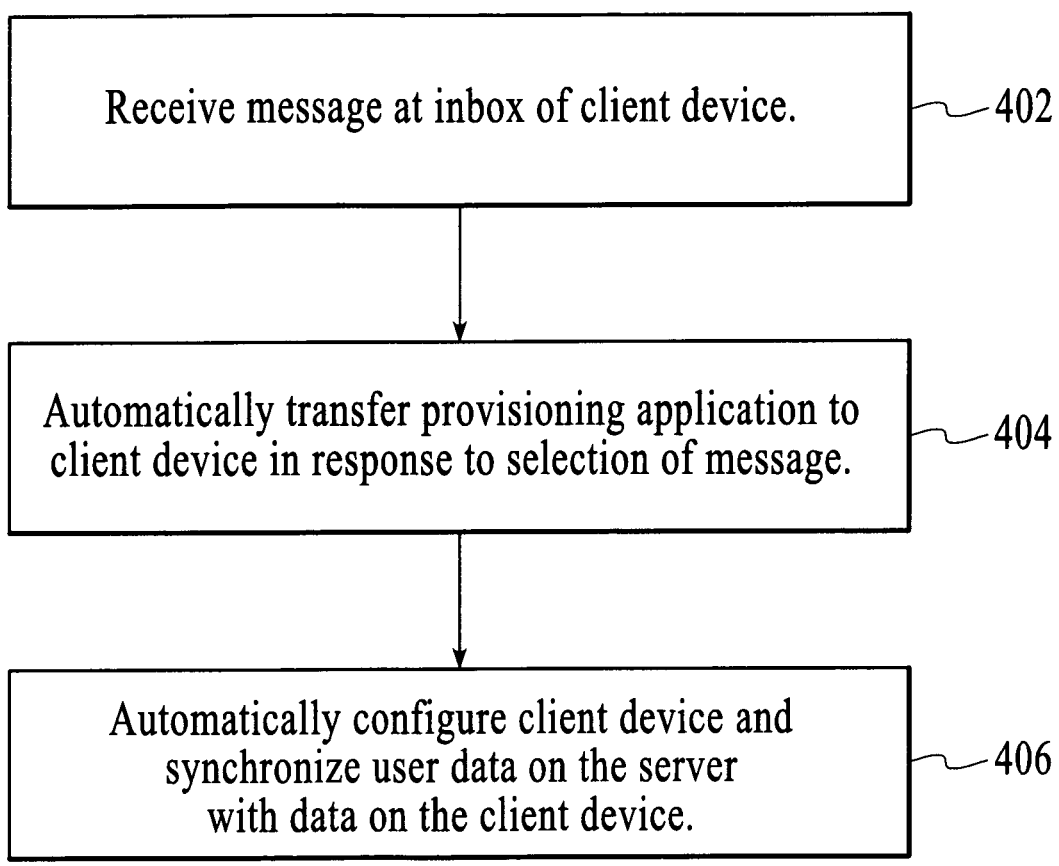
FIG. 4 is a flow diagram for provisioning, under an embodiment.

As an example of provisioning, FIG. 4 is a flow diagram 400 for provisioning, under an embodiment. The provisioning 400 includes receiving 402 a message at an inbox of a device. The message includes information of an electronic location of the provisioning server from which to download the appropriate application and device and user-specific information used for configuration of the application. An application is automatically transferred 404 to the device in response to selection of the received message by a user of the device. The application is automatically installed on the device. The application is auto-started, at which time it self-configures 406 using the original message.

The provisioning server, as a component of the facilitator, can be integrated with the host enterprise servers, but is not so limited. The provisioning includes a download component and a configuration component that is activated automatically via one user step. The provisioning server performs provisioning using an archive resource information received from the application provider or any other service provider. The archive resource information can be in an archive resource file that includes applications for various device types, supported target devices and operators/service providers that support target devices, and device and service provider configuration information.

The provisioning server is generally configured to transmit a push message to the device. The push message includes information like, for example, provisioning server and facilitator server locations (host names and ports), user name of user to provision, and device and service provider configuration information, etc. The push message can be any message type including, but not limited to, an SMS message, email message, or any other message type accepted by a particular target device. A device is targeted to receive the message using the device phone number or any other unique device identifier, e.g. IP address, MAC address, or name. The target device of an embodiment receives the push message in a message or push inbox. In response to a user selecting or "clicking" information of the received push message, the device browser downloads the client to the device; on some devices user selection is not necessary if a secret phrase is known or if the message is sent from a authenticated user with specific permissions. Following the download, the application is installed on the device. The application then retrieves the push message from the inbox, parses the text of the message, and configures itself using information of the message, as described in detail below.

The provisioning server hosts the applications that can be or are available for download. A provisioning portal serves as the user interface front-end to the provisioning server, and can be linked from a section of the user portal and from the admin portal of the facilitator. A user desiring to configure a device for use with the AMC system enters via the portal the device name, phone number, service provider, and handset model; the service provider and model are entered using pull-down lists but the embodiment is not so limited.

In response to the information received from the user through the portal, the facilitator (e.g. provisioning server) generates and transmits a push message to the device. The push message can be any type of electronic message, for example, an SMS message, email message, or any other type of device-specific push mechanism or message. The push message used in the description herein is an SMS message, but alternative embodiments can use other message types. The message includes both the URL of the location of the provisioning server, from where the handset can download the software, the URL of the location of the facilitator, to which the application may connect after it is configured, and user- and device-specific information needed for configuration.

An example URL of an embodiment includes but is not limited to the following form:

http://<provisioning server hostname>:<port>/p?t=<string>&d=<deviceid>&u=<username>&p=<facilatotor_port>&a=<access_point>&s=<0 | 1>&h=<facilitator_hostname> but the URL of various alternative embodiments can include different types and/or combinations of parameters. The variables of the URL represent but are not limited to the following parameters: "provisioning server hostname" represents or includes information of the hostname of the provisioning server; "port" represents or includes information of the provisioning port; "d" represents or includes information of the new identification of the device being provisioned; "u" represents or includes information of the username of the user; "h" represents or includes information of the hostname of the facilator, "p" represents or includes information of the port to be used for connections by the provisioned client to the facilitator; "a" represents or includes information of the default access point string (the client does a case-insensitive match); "s" represents or includes information of the scheme indicating a SSL client-facilitator coupling ("1") or a non-SSL client-facilitator coupling ("0"); "t" represents or includes information of a public key agreed upon by the client application and facilitator to enable the application to quickly find the facilitator-generated provisioning message in the device inbox. In an alternative embodiment, the s parameter, instead of presenting a binary option between two known protocols, will simply specify the protocol to use.

In system deployments of an embodiment, the provisioning server and facilitator server are both behind (reverse) proxy servers, load balancers, and/or NATs. In this configuration, the provisioning server and facilitator hostname and port information reference the publicly available server (e.g. proxy, load balancer and/or NAT) and these servers are in turn configured to direct the connection to the appropriate hidden server(s). In other cases, some devices can be outside the firewall while other devices can be inside the firewall, in which case the facilitator and provisioning hostname and ports are dynamically determined by the provisioning server in the generated message based on additional information about the placement of the device relative to the network topology. In other cases, the hostname and ports can be the same in both cases, but the name resolution of hostnames is different for the two scenarios due to the two using different name resolution servers (e.g., DNS servers).

The SMS contents are wrapped or embedded in text to make the contents relatively user-friendly but the embodiment is not so limited. An example SMS message is as follows:

"Go to http://shadow.orative.net:8080/p?t=tj3fds3&d=5&u=saurav&p=5443&a=MediaNet&s=1"&h=trial.orative.net In case the SMS message never reaches the target device, the provisioning portal re-transmits the SMS message. For example, an SMS message that is undelivered can be resent once every minute, but is not so limited.

Upon arrival at the target device, the SMS message is placed in a mailbox or inbox. The mailbox includes, for example, an SMS inbox or push inbox, but is not so limited. The user or subscriber selects or opens the SMS message and clicks on or selects the URL in the SMS message; a portal wizard of the AMC system is configured to provide help and/or troubleshooting information to help the subscriber "click" on the URL in the SMS message. Selection of the URL launches the device web browser which couples or connects to the facilitator (e.g. provisioning server). The provisioning server, when detecting with the connection and request from the target device, determines the application that corresponds to the device using information of the username and device id of the device, and transmits the appropriate application to the device.

In an alternative embodiment, the application is not downloaded over the air (OTA) to the client device but is instead downloaded to a computer and then transferred to the client device via another mechanism like Bluetooth, electronic mail, etc. In yet another embodiment, the client application is downloaded from a server separate from the provisioning server. Once the application is received, the configuration is performed using the push message generated by the provisioning server as described herein.

Upon downloading the application from the facilitator (e.g. provisioning server), the device browser invokes the device installer to install the application which then automatically starts executing. The application searches the SMS inbox and identifies the latest SMS message with the provisioning string (e.g. "tj3fds3"), and parses the SMS of the identified message for information that includes, but is not limited to, the access point, username, deviceid, port, scheme, and hostname. The AMC system URL is constructed as follows:

<scheme> '://' <facilitator_hostname> ':' <p> where "scheme" represents an actual protocol (in one embodiment) or includes one of two protocols, either 'orative' or 'oratives' depending on the binary value of 's'. If the executing application cannot find a message that includes the provisioning string in the SMS inbox, the application cannot be provisioned; an error message is indicated on a dialog box of the device and the user can optionally reinitiate the full provisioning.

In an alternative embodiment, instead of the application searching the inbox for a message, the device directs the push message to the client application. Generally, these are denoted as application-directed push messages and the push message includes an identification that matches the identification of the application, but the embodiment is not so limited.

Once the application locates and identifies a provisioning string, the application prompts the user via the device UI to configure the application with the information. If the user selects "No" as the response to the provisioning prompt, the application is not configured and instead exits; the same process then re-occurs the next subsequent time the application is restarted.

The information required for configuration and connection to the facilitator, except the user password, is provided by the provisioning server-generated message. The user enters his/her password from the device.

After configuration is complete, the application couples to the facilitator and negotiates capabilities (i.e., sends a CN_REQ_CS message in OLWP). The User Agent string in the CN_REQ_CS message includes the official software build number. The application also sends to the facilitator the username, password and device identification (e.g. deviceid) in an AUTH_START_CS message.

Once the user logs in and is authenticated, a "handset" OML message is sent to the application as part of the regular synchronization. An example OML message is as follows:

```
<HANDSET>
  <name>NAME</name>
  <phone_number>PHONE</phone_number>
  <service_provider>SP</service_provider>
  <model>MODEL</model>
  <secret_phrase>SECRET_PHRASE</secret_phrase>
</HANDSET>
``` where "NAME" represents the device name as entered on the provisioning portal, "PHONE" represents a telephone number of the device as entered on the provisioning portal, "SP" represents the service provider as entered on the provisioning portal, "MODEL" represents a model of the device as entered on the provisioning portal, and "SECRET_PHRASE" represents a globally unique identifier (GUID) generated on the facilitator.

The device state may be changed on a device subsequent to device provisioning if the user changes the phone number of the device. This field, and the description field, can be changed via the user portal, and the update information is propagated to the appropriate device.

If editing information of a device from a facilitator portal, the user has the option to change the phone number of the device. If the phone number is changed (e.g., the SIM card is replaced), the application only receives a configuration state update and is not required to be re-installed. If the user changes to a different service provider (the access point changes) subsequent to provisioning the device, an SMS is sent to the phone from the server with the new access point information.

The provisioning server is seeded with data from an Archive Resource (AR) file. The AR file, which is received from a provider, includes application software for supported target devices, information of target devices and operators/service providers, service provider access points and other such service provider information, device model information, documentation, etc. More specifically, the AR file includes information of the list of devices supported, their configuration, documentation, and their respective AMC client application software. The AR file may be updated by a provider as the devices, configuration, and/or software changes. Updates to the AR file can be conveyed to customers via numerous mechanisms like, for example, CDs or email. Additionally, the AR file is made available for download from a web site; the provisioning server can connect to this website and automatically download the latest AR file when it is available.

When the facilitator and provisioning server determine that a software application update is available, it notifies each user of the update. The user can then re-provision to get an update. Because all user data is persisted on the facilitator, reconnecting and re-authenticating retrieves the state.

Provisioning includes installing the application on a device, configuring the application, and synchronizing the user's data using the installed application, as described above. Installation is supported using a native Symbian installer program of the device but is not so limited. Configuration and synchronization information is provided via a Provisioning View of the device UI provided by the AMC client.

An example follows of application installation on a device. This example includes use of the Orative Enterprise Software from Orative Corporation of San Jose, Calif., but the provisioning of an embodiment is not limited to this system and/or this example. A user goes to the user portal to 'add a new device.' Here he enters the handset model, service provider, and phone number and name. The provisioning server generates a SMS message and pushes it out to the device. The user then invokes this message on the device, which downloads the application onto the device. The native installer installs the Orative client on the device.

Once the application is downloaded and installed, it is considered to be in an un-provisioned state. There are three possible provisioning states of an embodiment. The application starts up and behaves according to its current provisioning state. In the un-provisioned state, the application generates the Provisioning View and searches for the provisioning SMS. In a provisioning state, the application displays the Provisioning View via the device UI and synchronizes data with the Orative server (facilitator) based on the connection and account settings stored from the provisioning SMS. In a provisioned state, the application displays the home view via the device UI.

The Provisioning View is displayed on the device when the application is started in un-provisioned or provisioning states. The functions of the Provisioning View are to configure and synchronize the user's data. The Provisioning View includes status indicators displayed in a status bar as with other views in the application. Provisioning status text is displayed in a pre-specified area or region (e.g. top) of the device screen.

When the application is in the un-provisioned state, it causes the Provisioning View to be displayed and it searches the Messaging Inbox of the host device for the most recent SMS message including the account information of the user. The Orative Client uses the most recent provisioning SMS found in the Messaging Inbox of the device messaging application. The application causes a status message (e.g. "Scanning Inbox for SMS . . . ") to be displayed while searching for the SMS message.

If the application cannot find the SMS, it causes an error message (e.g. "Provisioning SMS not found. App will exit.") to be displayed. The application exits or ceases operation following display of the error message.

If the application finds the SMS, it prompts the user to confirm the account information and causes a status message (e.g. "Verifying account . . . ") to be displayed. The application also causes a confirmation dialog to be displayed that includes a user prompt to confirm or reject settings (e.g. "Provisioning for username. Accept?"). If the user confirms the settings the application continues provisioning; if the user rejects the settings in response to the prompt, the application exits.

Following confirmation of settings, the user is prompted for his/her password (e.g. "Please enter your password to access Orative"). If the user cancels out of the password prompt, the application exits. If the user enters a password, the application continues the provisioning. The application attempts to connect to the facilitator using the access point provided in the provisioning SMS, and causes a status message (e.g. "Connecting to server . . . ") to be displayed. If the access point is not found, a dialog is displayed to let the user choose an access point.

When the application is in the provisioning state, it attempts to connect to the provisioning server, login to the user's account and synchronize the user's data to the handset. If the connection to the server cannot be completed due to failure or due to timeout, the application causes an error message to be displayed and changes the status text (e.g. "Waiting to retry . . ."). The application then delays a pre-specified period of time and following the delay re-attempts connecting with the provisioning server. This gives the user an opportunity to correct any connection errors such as changing the access point.

When the application establishes a connection to the provisioning server it causes the status to be changed (e.g. "Authenticating . . ."). If authentication fails, the application disconnects, and causes an error message (e.g. "Authentication failure. Please try your password again.") to be displayed. If authentication succeeds, the application causes the status to be changed (e.g. "Completing provisioning . . ."). When the provisioning process completes, the application causes the Home View to be displayed.

Figure 5:
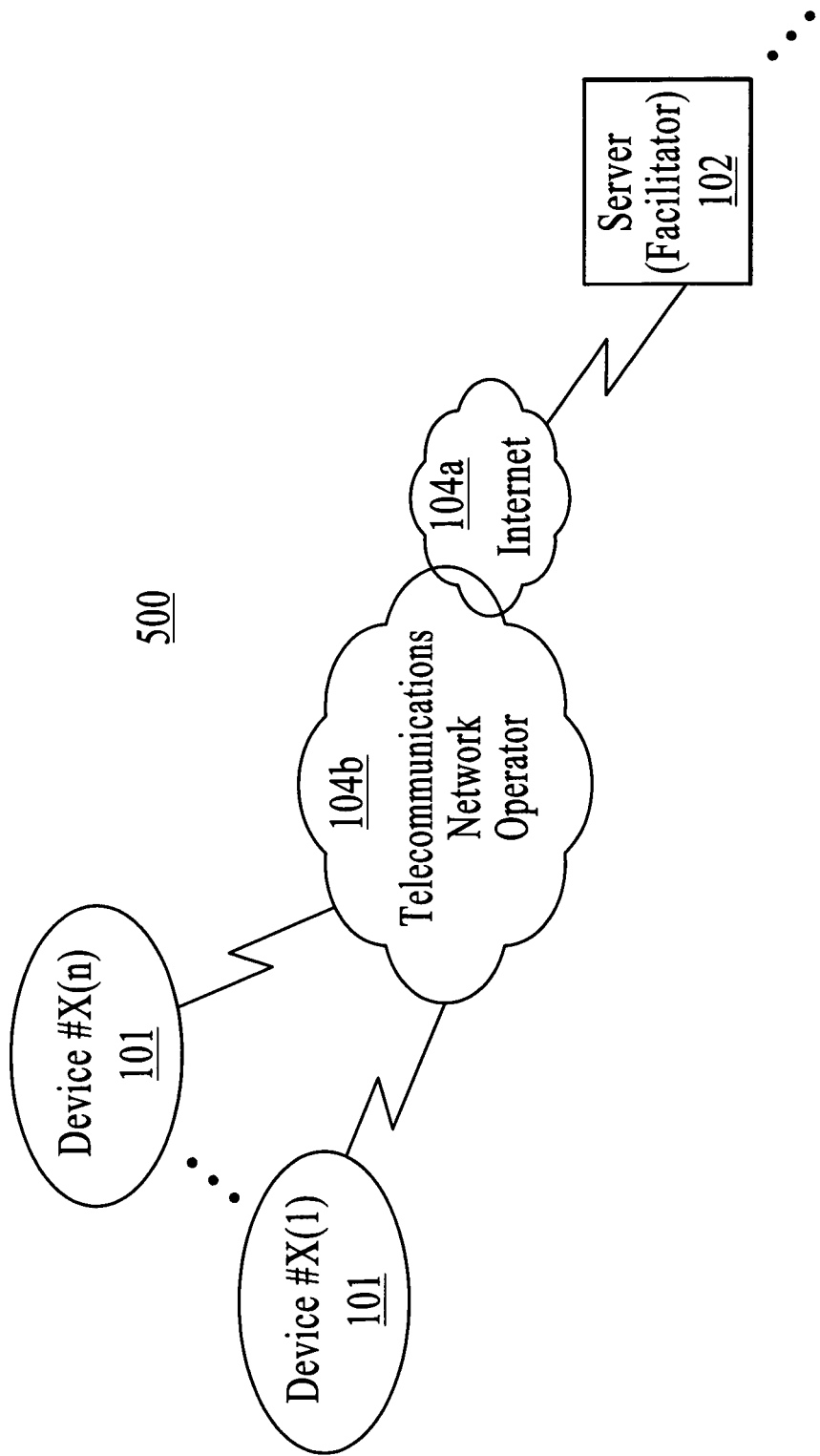
FIG. 5 is a block diagram of an AMC system, under an alternative embodiment.

Some examples follow of alternative AMC system configurations that include the facilitator and client described above. FIG. 5 is a block diagram of an AMC system 500, under an alternative embodiment. The AMC system 500 includes a server or other processor-based device hosting the facilitator 102. The facilitator 102 communicates with one or more client devices 101 to provide AMC system functions among the client devices 101 via network couplings that include the Internet 104a and a telecommunications network 104b. The telecommunications network 104b includes, for example, a cellular telephone network or a public switched telephone network (PTSN), but can be other voice and data communication networks as known in the art. The cellular telephone network can use communication protocols that include, for example, Global System for Mobile communication (GSM), General Packet Radio Service (GPRS), Code Division Multiple Access (CDMA), and Time Division Multiple Access (TDMA), but are not so limited.

Figure 6:
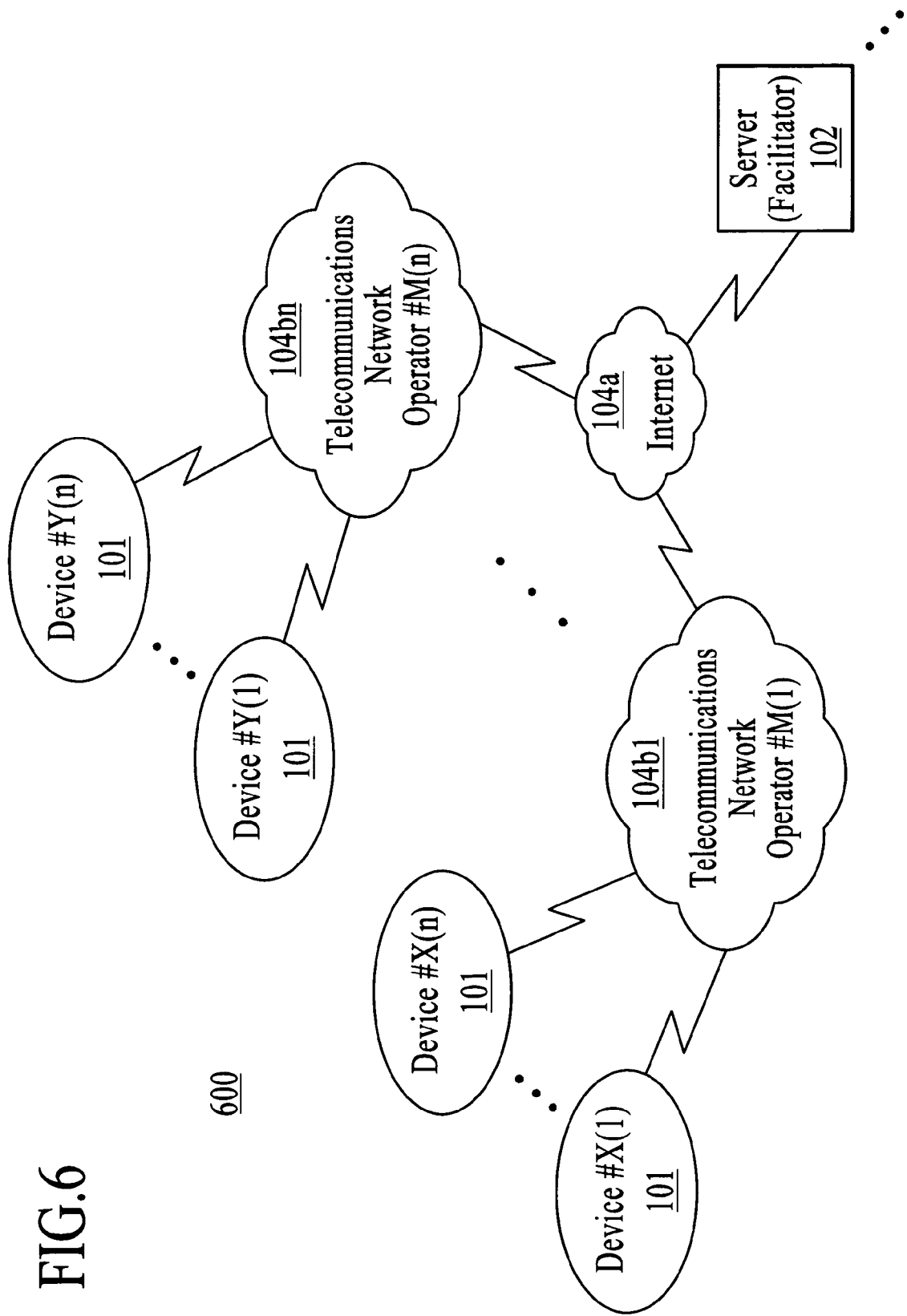
FIG. 6 is a block diagram of an AMC system, under another alternative embodiment.

FIG. 6 is a block diagram of an AMC system 600, under another alternative embodiment. The AMC system 600 includes a server hosting the facilitator 102, and the facilitator 102 communicates with one or more client devices 101 to provide AMC system functions among the client devices 101 via network couplings that include the Internet 104a and/or multiple telecommunications networks 104b1 to 104bn. The telecommunications networks 104b1-104bn are as described above with reference to FIG. 5, but are not so limited.

Figure 7:
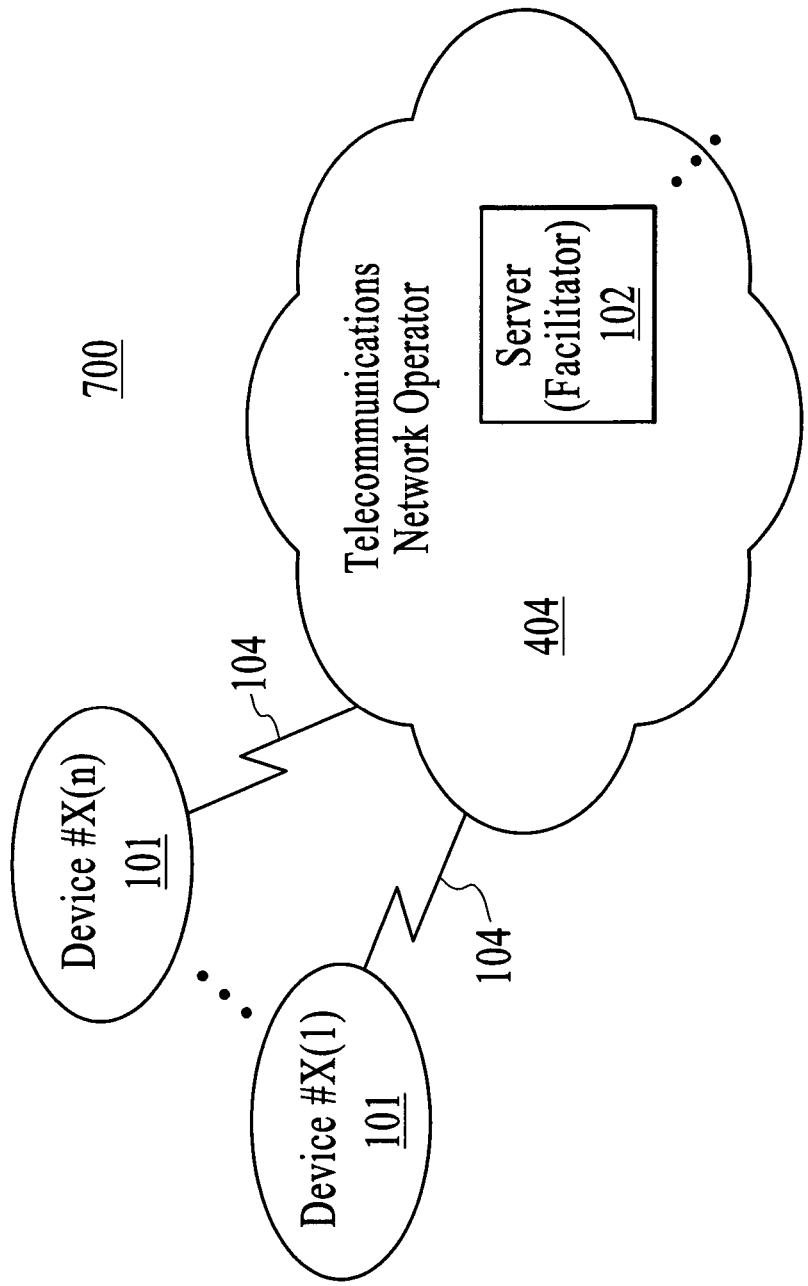
FIG. 7 is a block diagram of an AMC system, under yet another alternative embodiment.

FIG. 7 is a block diagram of an AMC system 700, under yet another alternative embodiment. The AMC system 700 includes a server hosting the facilitator 102, and the server/facilitator 102 is a component of a telecommunications network operator infrastructure. The facilitator 102 communicates with one or more client devices 101 to provide AMC system functions among the client devices 101 via network couplings 104, as described above, but is not so limited.

Figure 8:
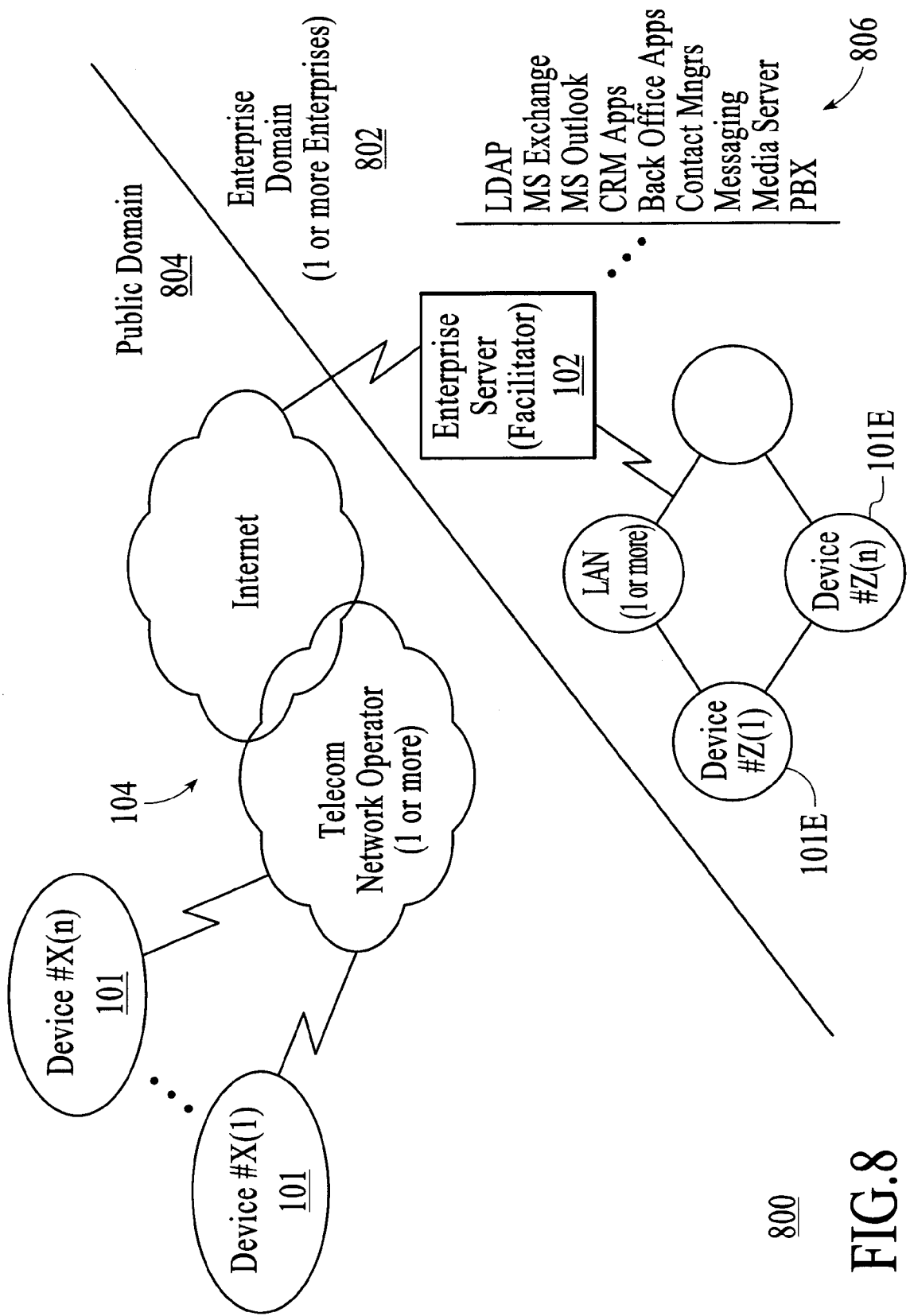
FIG. 8 is a block diagram of an AMC system in an enterprise domain, under another alternative embodiment.

FIG. 8 is a block diagram of an AMC system 800 in an enterprise domain, under another alternative embodiment. The AMC system 800 includes a server hosting the facilitator 102 where the server/facilitator 102 is a component of a corporate or enterprise infrastructure 802. The server can host numerous additional applications 806 in addition to the facilitator 102 or can be dedicated to the facilitator 102. The facilitator 102 communicates with one or more client devices 101 in the public domain 804 to provide AMC system functions among the client devices 101 via network couplings 104. The network couplings 104 include, for example, the Internet and one or more telecommunication service provider infrastructures, but can include any number/type of couplings. The facilitator 102 also communicates with one or more client devices 101E in the enterprise domain 802 to provide AMC system functions among the client devices 101E as described below. The client devices 101E in the enterprise domain 802 are shown coupled to one or more LANs, but are not so limited.

Figure 9:
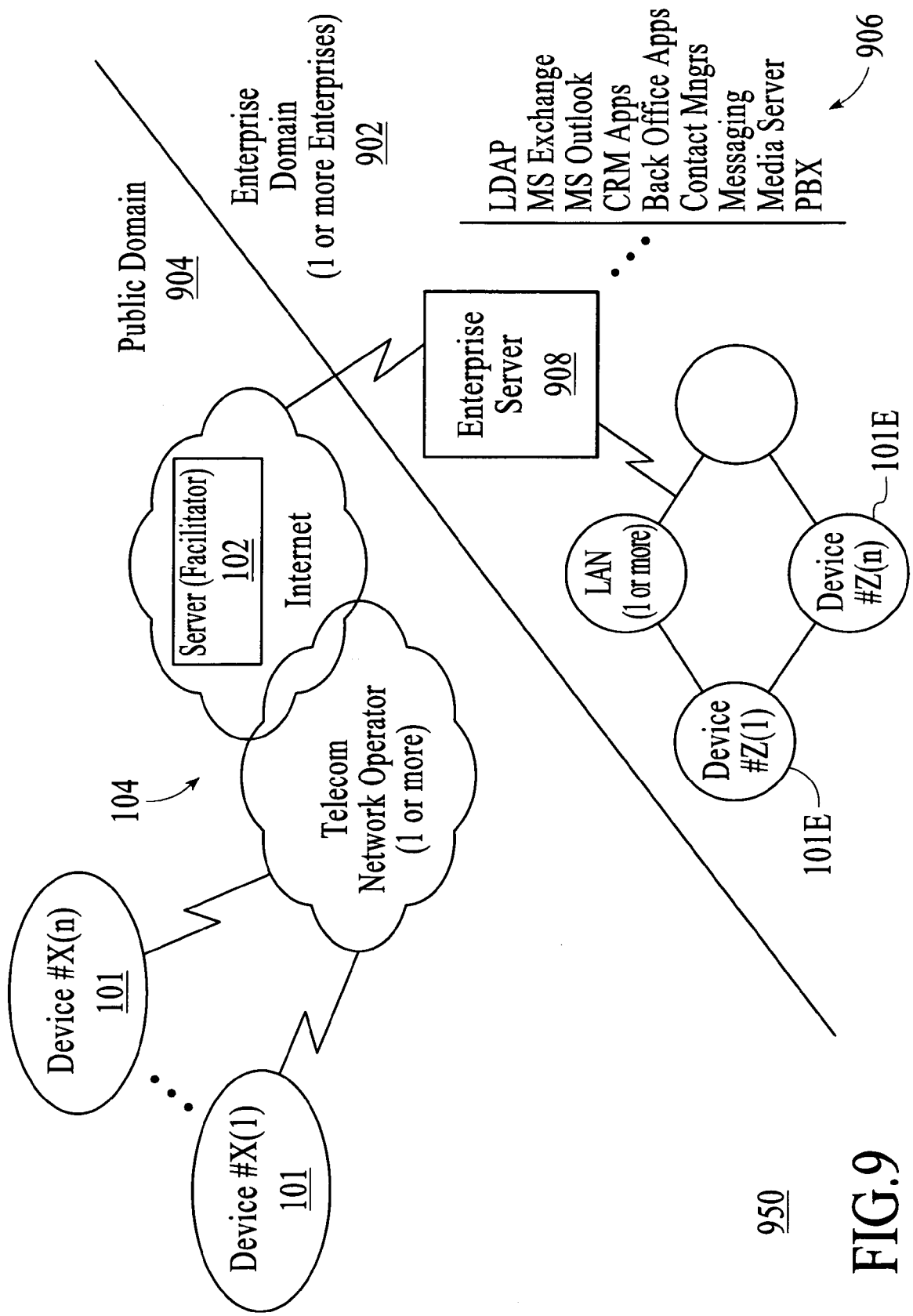
FIG. 9 is a block diagram of an AMC system in a public domain coupled across components of an enterprise domain, under another alternative embodiment.

FIG. 9 is a block diagram of an AMC system 950 in a public domain coupled across components of an enterprise domain, under another alternative embodiment. The AMC system 950 includes a server hosting the facilitator 102 where the server/facilitator 102 is a component of a carrier or service provider infrastructure or hosted data center infrastructure for example, but is not so limited. The facilitator 102 communicates with one or more client devices 101 in the public domain 904 to provide AMC system functions among the client devices 101 via network couplings 104. The network couplings 104 include, for example, the Internet and one or more telecommunication service provider infrastructures, but can include any number/type of couplings. The facilitator 102 also communicates with components of the enterprise domain 902 including, for example, one or more client devices 101E, one or more enterprise servers 908, and one or more LANs. The facilitator 102 provides AMC system functions among the client devices 101E as described below. The client devices 101E in the enterprise domain 902 are shown coupled to one or more LANs, but are not so limited.

As an alternative to the couplings of this AMC system 900, the facilitator can be hosted on one or more servers (not shown) of the telecommunications network operator. The facilitator of the telecommunications network operator couples to the enterprise servers via local contact servers (not shown) and/or Virtual Private Network (VPN) couplings, but is not so limited.

Figure 10:
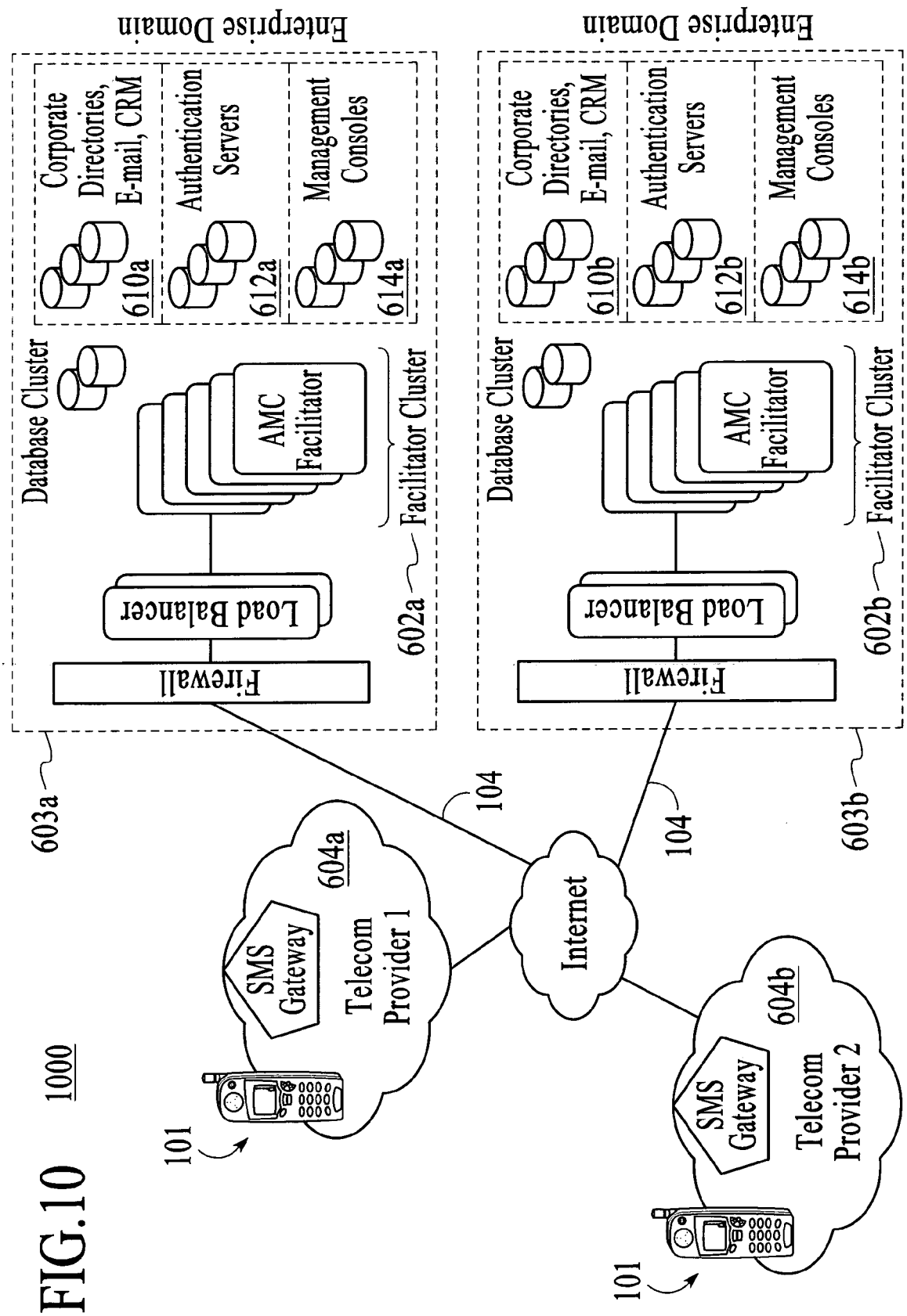
FIG. 10 is a block diagram of an AMC system in an enterprise domain, under still another alternative embodiment.

FIG. 10 is a block diagram of an AMC system 1000 in an enterprise domain, under still another alternative embodiment. The AMC system 1000 includes one or more facilitators that form facilitator clusters 602a and 602b within each of a number of enterprise domains 603a and 603b. Facilitators of the facilitator clusters 602a and 602b communicate with one or more client devices 101 to provide AMC system functions among the client devices 101 via network couplings 104. The network couplings 104 include, for example, at least one of the Internet and multiple telecommunication service providers 604a and 604b, but can include any number/type of couplings. The facilitators also couple with at least one of corporate directory servers and/or electronic mail (email) servers 610a/610b, authentication servers 612a/612b, and management consoles 614a/614b of the enterprise domains 603a/603b, but are not so limited.

Figure 11:
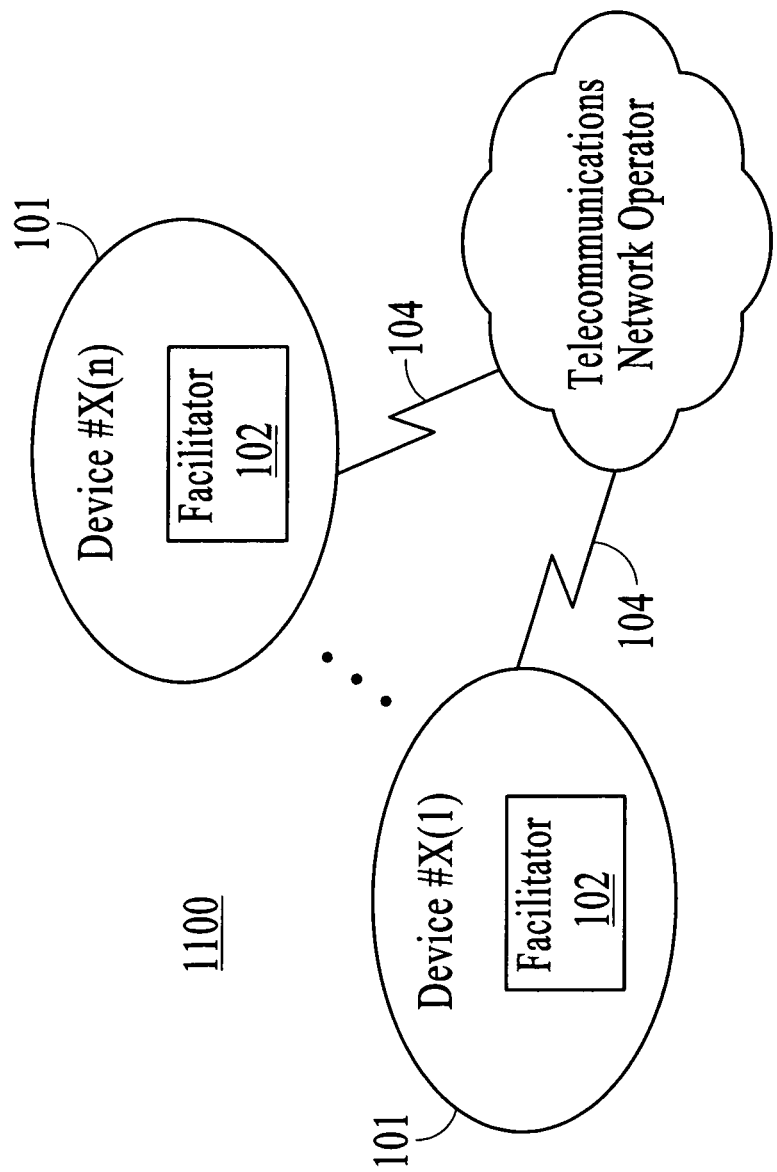
FIG. 11 is a block diagram of an active mobile collaboration (AMC) system, under an embodiment.

FIG. 11 is a block diagram of an active mobile collaboration (AMC) system 1100, under an embodiment. The AMC system 1100 includes any number X(n) of communication devices 101 coupled for communication via one or more facilitators 102 and one or more couplings 104. One or more of the communication devices 101 include an AMC client application. Additionally, one or more of the communication devices 101 include the facilitator 102. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below.

The AMC system components including the facilitator and AMC client described above function to allow users of the client devices or handsets like cellular telephones to quickly coordinate conversations, screen unwanted calls and interruptions and access enterprise directories. Specifically, the AMC system components increase call success rates by dynamically managing how and when mobile calls take place, let users intelligently screen calls based on caller identity, urgency and subject matter, quickly show which contacts are available to talk and which contacts choose not to be disturbed, reduce interruptions while encouraging urgently needed call-backs, and increase accessibility of enterprise and personal contact information from mobile phones.

The communications systems described herein include a method comprising, receiving a message at an inbox of a client device, automatically transferring an application to the client device in response to selection of the message, and automatically launching the application upon receipt at the client device, the launching including configuring the client device.

In one embodiment of a method, the message is a push message.

In one embodiment of a method, a provisioning server pushes the push message to the client device.

In an embodiment, the method further comprises transmitting the message to the client device, wherein the transmitting includes pushing the message to the client device.

In one embodiment of a method, the client device is a mobile device.

In one embodiment of a method, the message includes a Short Message Service (SMS) message, an electronic mail (email) message, a Wireless Application Protocol (WAP) push message, a Blackberry push message, a device-specific electronic message, and a device-specific push message.

In one embodiment of a method, the message includes one or more of electronic provisioning information of the source device and user information of a user of the client device.

In one embodiment of a method, the provisioning information includes location information of the application.

In one embodiment of a method, the provisioning information includes a Uniform Resource Locator (URL) for locating the source device and its access mechanism.

In one embodiment of a method, the provisioning information includes information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

In one embodiment of a method, the message includes text.

In one embodiment of a method, the source device is one or more of a provisioning server, at least one server hosting the provisioning server, a proxy server coupled to the provisioning server, and a load balancer coupled to the provisioning server.

In an embodiment, the method further comprises determining the client device fails to receive the message, and re-initiating the transferring in response to the determining.

In one embodiment of a method, the selection of the message includes user selection of a component of the message.

In one embodiment of a method, the component of the message includes a Uniform Resource Locator (URL) for a source of the message.

In one embodiment of a method, automatically transferring comprises, launching a browser of the client device, and forming a coupling with the source device.

In one embodiment of a method, automatically transferring comprises selecting the application from a plurality of applications.

In one embodiment of a method, the selecting uses information from a user of the client device and identification information of the client device.

In one embodiment of a method, a user of the client device performs the selecting.

In one embodiment of a method, the source device performs the selecting using information of one or more of a service provider of the client device and one or more characteristic of the client device.

In one embodiment of a method, the at least one characteristic includes one or more of operating system, model, screen size, connection type, memory, language, and language version of the client device.

In one embodiment of a method, automatically transferring comprises downloading the application to the client device using a browser of the client device.

In one embodiment of a method, the configuring comprises, searching the inbox and locating the message, and parsing the message for one or more of electronic provisioning information of the source device and user information of a user of the client device.

In one embodiment of a method, the provisioning information includes information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

In an embodiment, the method further comprises receiving device information, the device information including one or more of a name of the client device, a model of the client device, a telephone number of the client device, a service provider of service of the client device, and electronic identification information of the client device.

In one embodiment of a method, receiving comprises sending via at least one portal.

In an embodiment, the method further comprises transferring the message to the client device using the user information.

In an embodiment, the method further comprises generating an archive resource file that includes information of the client device.

In one embodiment of a method, the information of the client device in the active resource file includes one or more of client devices supported, client device configurations, client device documentation, and client device applications.

In an embodiment, the method further comprises seeding the source device using information of the archive resource file.

In one embodiment of a method, the source device is lacking information of the client device prior to the seeding.

In an embodiment, the method further comprises, periodically updating the archive resource file to generate an updated archive resource file, and periodically re-seeding the source device with the updated archive resource file.

In an embodiment, the method further comprises transmitting a notification to the client device, the notification including information of an updated version of the application.

In one embodiment of a method, the message includes the notification, and the application includes the updated application.

In an embodiment, the method further comprises synchronizing user data on the client device with user data on a source device.

The communications systems described herein include a system comprising, a server, wherein the server is coupled to an enterprise and a communication network that includes a client device, and a provisioning component coupled to the server and configured to transfer a message to the client device, wherein the client device is configured to couple with the provisioning component and the provisioning component is configured to automatically transfer an application to the client device in response to selection by a user of a portion of the message received at an inbox of the client device, the application configured to automatically launch upon receipt at the client device, the launching including configuring the client device and synchronizing user data on the client device with user data on the server.

In an embodiment of a system, the provisioning server is configured to push the message to the client device, wherein the message includes a Short Message Service (SMS) message, an electronic mail (email) message, a Wireless Application Protocol (WAP) push message, a Blackberry push message, a device-specific electronic message, and a device-specific push message.

In an embodiment of a system, the message includes one or more of electronic provisioning information of the source device and user information of a user of the client device.

In an embodiment of a system, the provisioning information includes location information of the application.

In an embodiment of a system, the provisioning component is configured to determine the client device fails to receive the message and re-initiate the transferring in response to the determining.

In an embodiment of a system, the selection of the message includes user selection of a component of the message.

In an embodiment of a system, automatically transferring comprises selecting the application from a plurality of applications.

In an embodiment of a system, the selecting uses information from a user of the client device and identification information of the client device.

In an embodiment of a system, a user of the client device performs the selecting.

In an embodiment of a system, the source device is configured to perform the selecting using information of one or more of a service provider of the client device and one or more characteristic of the client device, wherein the at least one characteristic includes one or more of operating system, model, screen size, connection type, memory, language, and language version of the client device.

In an embodiment of a system, automatically transferring comprises downloading the application to the client device using a browser of the client device.

In an embodiment of a system, the configuring comprises, searching the inbox and locating the message, and parsing the message for one or more of electronic provisioning information of the source device and user information of a user of the client device.

In an embodiment of a system, the provisioning information includes information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

In an embodiment of a system, one or more of the server and the provisioning component if configured to generate an archive resource file that includes information of the client device, wherein the information of the client device in the active resource file includes one or more of client devices supported, client device configurations, client device documentation, and client device applications.

In an embodiment of a system, one or more of the server and the provisioning component is configured to seed the source device using information of the archive resource file.

In an embodiment of a system, one or more of the server and the provisioning component is configured to transmit a notification to the client device, the notification including information of an updated version of the application, wherein the message includes the notification, and the application includes the updated application.

In an embodiment, the system further comprises synchronizing user data on the client device with user data on a source device.

The communications systems described herein include a computer readable media including executable instructions which, when executed in a processing system, automatically provisions a client device by, receiving a message at an inbox of the client device, automatically transferring an application to the client device in response to selection of the message, and automatically launching the application upon receipt at the client device, the launching including configuring the client device.

The communications systems described herein include a method comprising, receiving a message at an inbox of a client device, wherein the message includes a melt command, authenticating a source of the message, and automatically deleting client state information of the client device in response to determining the message is from an authenticated source.

In an embodiment of a method, the authenticating includes, parsing the message to determine a key, and authenticating the source by comparing the key of the message to information previously received.

In an embodiment of a method, the key includes a pseudo-random number.

In an embodiment of a method, the key is a Globally Unique Identifier (GUID).

In an embodiment, the method further comprises determining a connectivity state of the client device.

In an embodiment, the method further comprises transmitting the message from a host server when the connectivity state of the client device is connected with the host server.

In an embodiment, the method further comprises, when the connectivity state of the client device is a persistent connection state with a host server, detecting a coupling of the client device with the host server, and detecting an attempt by the client device to authenticate with the host server and, in response, transmitting the message.

In an embodiment, the method further comprises pushing the message to the client device, wherein the message is an application-directed message, wherein the source is a host server.

In an embodiment of a method, the application-directed message includes a Short Message Service (SMS) message, an electronic mail (email) message, a device-specific electronic message, a Wireless Application Protocol (WAP) push message, a Blackberry push message, and a device-specific push message.

In an embodiment, the method further comprises removing a session maintained by the source on behalf of the client device.

In an embodiment, the method further comprises, when unable to verify a session between the client device and the host server, detecting an attempt by the client device to authenticate with the host server and, in response, transmitting the message.

In an embodiment of a method, the message is a push message.

In an embodiment, the method further comprises, transmitting the message to the client device, wherein the transmitting includes pushing the message to the client device.

In an embodiment of a method, the message includes a Short Message Service (SMS) message, an electronic mail (email) message, a device-specific electronic message, and a device-specific push message.

In an embodiment, the method further comprises receiving an electronic instruction to inactivate the device.

In an embodiment, the method further comprises re-authenticating the client device, wherein the re-authenticating re-synchronizes the client state information reinstated on the client device.

In an embodiment, the method further comprises re-provisioning the client device, wherein the re-provisioning reinstates the client state information on the client device.

In an embodiment of a method, the re-provisioning comprises, receiving a re-provisioning message at the inbox of the client device, automatically transferring an application to the client device in response to selection of the re-provisioning message, and automatically launching the application upon receipt at the client device, the launching including re-configuring the client device and re-synchronizing the client device.

In an embodiment, the method further comprises transmitting the re-provisioning message to the client device, wherein the transmitting includes pushing the message to the client device.

In an embodiment of a method, the re-provisioning message includes a Short Message Service (SMS) message, an electronic mail (email) message, a Wireless Application Protocol (WAP) push message, a Blackberry push message, a device-specific electronic message, and a device-specific push message.

In an embodiment of a method, the re-provisioning message includes one or more of electronic provisioning information of the source device and user information of a user of the client device.

In an embodiment of a method, the provisioning information includes a Uniform Resource Locator (URL) for locating the source device and its access mechanism.

In an embodiment of a method, the provisioning information includes information of one or more of a host name of the source device of the re-provisioning message, a provisioning port, an identification of the client device, user information, a port for remote couplings via a Web browser, a device access point string, a security level of the coupling, and a string agreed upon by the source device and the client device to indicating the provisioning URL.

In an embodiment of a method, the source device is one or more of a provisioning server, at least one server hosting the provisioning server, a proxy server coupled to the provisioning server, and a load balancer coupled to the provisioning server.

In an embodiment of a method, the selection of the re-provisioning message includes user selection of a component of the message.

In an embodiment of a method, the component of the re-provisioning message includes a Uniform Resource Locator (URL) for a source of the message.

In an embodiment of a method, automatically transferring comprises, launching a browser of the client device, and forming a coupling with the source device.

In an embodiment of a method, automatically transferring comprises downloading the application to the client device using a browser of the client device.

In an embodiment of a method, the configuring comprises, searching the inbox and locating the message, parsing the message for one or more of electronic provisioning information and user information of a user of the client device.

In an embodiment of a method, provisioning information includes information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

The communications systems described herein include a system comprising, a server, wherein the server is coupled to an enterprise and a communication network that includes a client device, and a melting component coupled to the server and configured to transfer a message to the client device, wherein the message includes a melt command, wherein the client device is configured to authenticate a source of the message, wherein the client device is configured to automatically delete client state information of the client device in response to determining the message is from an authenticated source.

In an embodiment of a system, the authenticating includes, parsing the message to determine a key, and authenticating the source by comparing the key of the message to information previously received.

In an embodiment of a system, at least one component of the system is configured to determine a connectivity state of the client device.

In an embodiment of a system, at least one component of the system is configured to push the message from a host server when the connectivity state of the client device is connected with the host server.

In an embodiment of a system, at least one component of the system is configured to, when the connectivity state of the client device is a persistent connection state with a host server, detect a coupling of the client device with the server, and detect an attempt by the client device to authenticate with the host server and, in response, transmit the message.

In an embodiment of a system, at least one component of the system is configured to remove a session maintained by the source on behalf of the client device.

In an embodiment of a system, at least one component of the system is configured to, when unable to verify a session between the client device and the host server, detect an attempt by the client device to authenticate with the host server and, in response, transmit the message.

In an embodiment of a system, the message includes a Short Message Service (SMS) message, an electronic mail (email) message, a device-specific electronic message, and a device-specific push message.

In an embodiment of a system, at least one component of the system is configured to receive an electronic instruction to inactivate the device.

In an embodiment of a system, at least one component of the system is configured to re-authenticate the client device, wherein the re-authenticating re-synchronizes the client state information reinstated on the client device.

In an embodiment of a system, at least one component of the system is configured to re-provision the client device, wherein the re-provisioning reinstates the client state information on the client device.

In an embodiment of a system, the re-provisioning comprises, receiving a re-provisioning message at the inbox of the client device, automatically transferring an application to the client device in response to selection of the re-provisioning message, and automatically launching the application upon receipt at the client device, the launching including re-configuring the client device and re-synchronizing the client device.

In an embodiment of a system, at least one component of the system is configured to transmit the re-provisioning message to the client device, wherein the transmitting includes pushing the message to the client device, wherein the re-provisioning message includes one or more of electronic provisioning information of the source device and user information of a user of the client device.

In an embodiment of a system, the selection of the re-provisioning message includes user selection of a component of the message.

In an embodiment of a system, automatically transferring comprises downloading the application to the client device using a browser of the client device.

In an embodiment of a system, the configuring comprises, searching the inbox and locating the message, and parsing the message for one or more of electronic provisioning information and user information of a user of the client device.

The communications systems described herein include a computer readable media including executable instructions which, when executed in a processing system, automatically melts a client device by, receiving a message at an inbox of a client device, wherein the message includes a melt command, authenticating a source of the message, and automatically deleting client state information of the client device in response to determining the message is from an authenticated source.

Aspects of the communications systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the communications systems include: microcontrollers with memory (such as electronically erasable programmable read-only memory (EEPROM)), embedded microprocessors, firmware, software, etc. Furthermore, aspects of the communications systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the communications systems is not intended to be exhaustive or to limit the systems and methods described to the precise form disclosed. While specific embodiments of, and examples for, the communications systems are described herein for illustrative purposes, various equivalent modifications are possible within the scope of other communications systems and methods, as those skilled in the relevant art will recognize. The teachings of the communications systems provided herein can be applied to other processing systems and methods, not only for the systems and methods described above.

The elements and acts of the various embodiments described above can be combined to provide further embodiments. These and other changes can be made to the communications systems in light of the above detailed description.

In general, in the following claims, the terms used should not be construed to limit the communications systems to the specific embodiments disclosed in the specification and the claims, but should be construed to include all systems that operate under the claims. Accordingly, the communications systems is not limited by the disclosure, but instead the scope of the communications systems is to be determined entirely by the claims.

While certain aspects of the communications systems are presented below in certain claim forms, the inventors contemplate the various aspects of the communications systems in any number of claim forms. Accordingly, the inventors reserve the right to add additional claims after filing the application to pursue such additional claim forms for other aspects of the communications systems.

What is claimed is:

1. A method comprising:
receiving a message at an inbox of a client device, the message comprising message content data, data corresponding to an identity of a message originator, and data corresponding to a location for obtaining an application and client device specific configuration information for the application;
automatically transferring the application from the location specified in the message to the client device in response to selection of the message;
automatically launching the application upon receipt at the client device, the launching of the application comprises searching the inbox of the client device for the message, parsing the message to obtain the client device specific configuration information from the message and self-configuring by the application using the client device specific configuration information from the message received at the inbox; and
generating an output corresponding to the message content data and the identity of the message originator on the client device in accordance with the launched application.

2. The method of claim 1, wherein the message is a push message.

3. The method of claim 2, wherein a provisioning server pushes the push message to the client device.

4. The method of claim 1, comprising transmitting the message to the client device, wherein the transmitting includes pushing the message to the client device.

5. The method of claim 4, wherein the client device is a mobile device.

6. The method of claim 1, wherein the message includes at least one of a Short Message Service (SMS) message, an electronic mail (email) message, a Wireless Application Protocol (WAP) push message, a Blackberry push message, a device-specific electronic message, or a device-specific push message.

7. The method of claim 1, wherein the message includes one or more of electronic provisioning information of the source device and user information of a user of the client device.

8. The method of claim 7, wherein the provisioning information includes a Uniform Resource Locator (URL) for locating the source device and its access mechanism.

9. The method of claim 7, wherein the provisioning information includes information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

10. The method of claim 7, wherein the message includes text.

11. The method of claim 1, wherein the source device is one or more of a provisioning server, at least one server hosting the provisioning server, a proxy server coupled to the provisioning server, and a load balancer coupled to the provisioning server.

12. The method of claim 1, comprising: determining the client device fails to receive the message; re-initiating the transferring in response to the determining.

13. The method of claim 1, wherein the selection of the message includes user selection of a component of the message.

14. The method of claim 13, wherein the component of the message includes a Uniform Resource Locator (URL) for a source of the message.

15. The method of claim 1, wherein automatically transferring comprises: launching a browser of the client device; and forming a coupling with the source device.

16. The method of claim 1, wherein automatically transferring comprises selecting the application from a plurality of applications.

17. The method of claim 16, wherein the selecting uses information from a user of the client device and identification information of the client device.

18. The method of claim 16, wherein a user of the client device performs the selecting.

19. The method of claim 16, wherein the source device performs the selecting using information of one or more of a service provider of the client device and one or more characteristic of the client device.

20. The method of claim 19, wherein the at least one characteristic includes one or more of operating system, model, screen size, connection type, memory, language, and language version of the client device.

21. The method of claim 1, wherein automatically transferring comprises downloading the application to the client device using a browser of the client device.

22. The method of claim 1, wherein the launching further comprises parsing the message for one or more of electronic provisioning information of the source device and user information of a user of the client device.

23. The method of claim 22, wherein the provisioning information includes information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

24. The method of claim 1, comprising receiving device information, the device information including one or more of a name of the client device, a model of the client device, a telephone number of the client device, a service provider of service of the client device, and electronic identification information of the client device.

25. The method of claim 24, wherein receiving comprises sending via at least one portal.

26. The method of claim 24, comprising transferring the message to the client device using the user information.

27. The method of claim 1, comprising generating an archive resource file that includes information of the client device.

28. The method of claim 27, wherein the information of the client device in the active resource file includes one or more of client devices supported, client device configurations, client device documentation, and client device applications.

29. The method of claim 27, comprising seeding the source device using information of the archive resource file.

30. The method of claim 29, wherein the source device is lacking information of the client device prior to the seeding.

31. The method of claim 27, comprising: periodically updating the archive resource file to generate an updated archive resource file; periodically re-seeding the source device with the updated archive resource file.

32. The method of claim 1, comprising transmitting a notification to the client device, the notification including information of an updated version of the application.

33. The method of claim 32, wherein the message includes the notification, and the application includes the updated application.

34. The method of claim 1, comprising synchronizing user data on the client device with user data on a source device.

35. The method of claim 1, wherein the searching for the message comprises searching for a message containing a predefined string.

36. A non-transitory, tangible computer readable media including executable instructions which, when executed in a processing system is operable to:
- automatically provision a client device by receiving a message at an inbox of the client device, the message comprising message content data, data corresponding to an identity of a message originator and data corresponding to a location for obtaining an application and client device specific configuration information;
- automatically transferring the application from the location specified in the message to the client device in response to selection of the message;
- automatically launching the application upon receipt of the application at the client device, the launching comprises searching the inbox of the client device for the message, parsing the message to obtain client device specific configuration information, and self-configuring the application using at least a portion of the message received at the inbox of the client device, the portion of the message received including the client device specific configuration information; and
- generating an output corresponding to the message content data and the identity of the message originator on the client device in accordance with the launched application.

37. A method comprising:
- receiving a message at an inbox of a client device, the message comprising message content data, data corresponding to an identity of a message originator and data corresponding to a location for obtaining an application and client device specific configuration information for the application;
- automatically transferring the application from the location specified in the message to the client device in response to selection of the message;
- receiving an application directed push message, the application directed push message comprising an identification and configuration data;
- matching the identification of the application directed push message with the application;
- configuring the application with configuration data from the application directed push message responsive to matching the identification of the application directed push message with the application;
- generating an output corresponding to the message content data and the identity of the message originator on the client device in accordance with the launched application.

* * * * *